United States Patent
Patel et al.

(10) Patent No.: US 7,428,557 B2
(45) Date of Patent: Sep. 23, 2008

(54) EFFICIENT DATA TRANSFER TO/FROM STORAGE MEDIUM OF COMPUTING DEVICE

(75) Inventors: Sachin Chiman Patel, Bellevue, WA (US); Andrew Martin Pearson, Redmond, WA (US); Yadhu N. Gopalan, Redmond, WA (US); Richard Thomas Palm, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 10/995,935

(22) Filed: Nov. 23, 2004

(65) Prior Publication Data

US 2005/0210075 A1     Sep. 22, 2005

Related U.S. Application Data

(60) Provisional application No. 60/555,393, filed on Mar. 22, 2004.

(51) Int. Cl.
   *G06F 12/00* (2006.01)
(52) U.S. Cl. .................. 707/200; 707/204; 707/205
(58) Field of Classification Search ............... None
   See application file for complete search history.

(56) References Cited

U.S. PATENT DOCUMENTS

| | | | | |
|---|---|---|---|---|
| 5,371,885 A | * | 12/1994 | Letwin | 707/205 |
| 5,778,430 A | * | 7/1998 | Ish et al. | 711/133 |
| 6,658,439 B2 | * | 12/2003 | Karasudani | 707/205 |
| 6,782,400 B2 | * | 8/2004 | Geuss et al. | 707/200 |
| 2002/0073090 A1 | * | 6/2002 | Kedem et al. | 707/10 |
| 2004/0019597 A1 | * | 1/2004 | Nishimura | 707/100 |

* cited by examiner

*Primary Examiner*—Khanh B. Pham
*Assistant Examiner*—Andalib F Lodhi
(74) *Attorney, Agent, or Firm*—Woodcock Washburn LLP

(57) ABSTRACT

An application issues an application command to a file system of the computing device, where the application command includes a location of data at a source. The file system allocates space on a medium for the data and compiles a list including an identification of each portion of the medium that is to be used to store the data. The file system then issues a file system command to a block driver of the medium, where the file system command includes the location of the data at the source and the compiled list. The block driver contacts the source, requests the data at the location thereof, and writes the data to the portions of the medium included in the compiled list.

14 Claims, 4 Drawing Sheets

EFFICIENT DATA TRANSFER TO/FROM STORAGE MEDIUM OF COMPUTING DEVICE

CROSS REFERENCE TO RELATED APPLICATION

This application claims the benefit of U.S. Provisional Application No. 60/555,393, filed Mar. 22, 2004 under attorney docket number 'MSFT-3516' and entitled "EFFICIENT DATA TRANSFER TO/FROM STORAGE MEDIUM OF COMPUTING DEVICE".

TECHNICAL FIELD

The present invention relates to a method by which data is transferred to or from a storage medium associated with a computing device. More particularly, the present invention relates to such a method by which the transferred data bypasses the file system of the computing device and is thus directly copied to or from the storage medium. Thus, better performance is achieved in, for example, transferring data between a hard drive on the computing device and an external storage medium, a network connection, or the like; a RAM on the computing device and the hard drive thereof; etc.

BACKGROUND OF THE INVENTION

In a computing device such as a personal computer or the like, data is transferred to or from a storage medium associated therewith by way of a file system on the computing device which manages the files on such storage medium. In particular, the file system organizes and maintains access to the storage medium, and processes requests to transfer data to or from the storage medium.

In the prior art, the file system receives the data to be transferred from the storage medium and forwards the data to a destination or receives the data to be transferred from a source and forwards the data to the storage medium, as the case may be. However, with the file system thus acting as an intermediary, a transfer of an especially large amount of data can be especially processing-intensive inasmuch as the data is transferred in portions and each portion requires a separate transfer to the file system and a separate transfer from the file system, as well as associated computational overhead.

In particular, in the prior art, a transfer of data from whatever source to a hard drive of the computing device, for example, is performed according to the following steps, generally. Preliminarily, an application on the computing device directs the file system of such computing device to create a file on the hard drive based on the data. Note that in doing so, the application need not necessarily inform the file system of the source of the data or the size of the data. Thereafter, the application obtains a first portion of the data from the source thereof, and delivers same to the file system, perhaps as part of a forwarded buffer, along with a command thereto to write the first portion of the data to the hard drive. Typically, the hard drive includes or has associated therewith a block driver or the like that interfaces with the file system, and the file system thus communicates with the hard drive by way of the block driver thereof. Also typically, the file system maintains sector information on each sector of the hard drive, including whether such sector is in use and if so what file is using such sector.

Accordingly, to write the first portion of the data to the hard drive, the file system refers to such sector information to determine available sectors for the first portion of the data and compiles a sector list including an identification of the sectors of the hard drive that are to be used to store the first portion of the data. As should be appreciated, the file system compiles the sector list in a generally known manner based at least in part on the size of the first portion of the data and the capacity of each sector. At any rate, the file system sends the first portion of the data and the sector list compiled therefor to the block driver of the hard drive, and the block driver then stores the first portion of the data onto the hard drive according to the sector list in a generally known manner.

Thereafter, the application obtains a second portion of the data from the source thereof, and in a manner generally identical to that set forth above delivers same to the file system along with a command to write the second portion of the data to the hard drive. As may be appreciated, the process continues as necessary with third, fourth, fifth, etc. portions of the data until all the data is transferred from the source thereof to the hard drive. Note that the process is similar when reading data from the hard drive to a destination, although of course the data travels through the file system in the opposite direction.

To summarize, then, in the prior art, each portion of data written to a hard drive or the like is first delivered from a source of such data to the file system and is then delivered from the file system to the hard drive, and likewise each portion of data read from the hard drive or the like is first delivered from the hard drive to the file system and is then delivered from the file system to a destination of such data. However, and again, such a process can be cumbersome and inefficient, especially when the amount of data is especially large and must all pass through the file system as an intermediary.

Accordingly, a need exists for a method by which data is delivered from a source or the like directly to a storage medium such as a hard drive or the like associated with a computing device without first passing through the file system of such computing device. Likewise, a similar need exists for a method by which data is delivered from such storage medium directly to a destination or the like without first passing through the file system of such computing device.

SUMMARY OF THE INVENTION

The aforementioned needs are satisfied at least in part by the present invention in which a method is provided for an application on a computing device to write data from a source to a storage medium associated with the computing device. In the method, the application issues an application command to a file system of the computing device, where the application command includes an identification of the source and a location of the data at the source. The file system based on space information maintained thereby allocates space on the medium for the data and compiles a list including an identification of each portion of the medium that is to be used to store the data. The file system then issues a file system command to a block driver of the medium, where the file system command includes the identification of the source and the location of the data at such source and also includes the compiled list. The block driver contacts the source at the identification thereof and requests therefrom the data at the location thereof, and writes the data at the location from the source to the portions of the medium included in the compiled list. A corresponding method is also provided for an application on a computing device to read from the storage medium to a destination.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
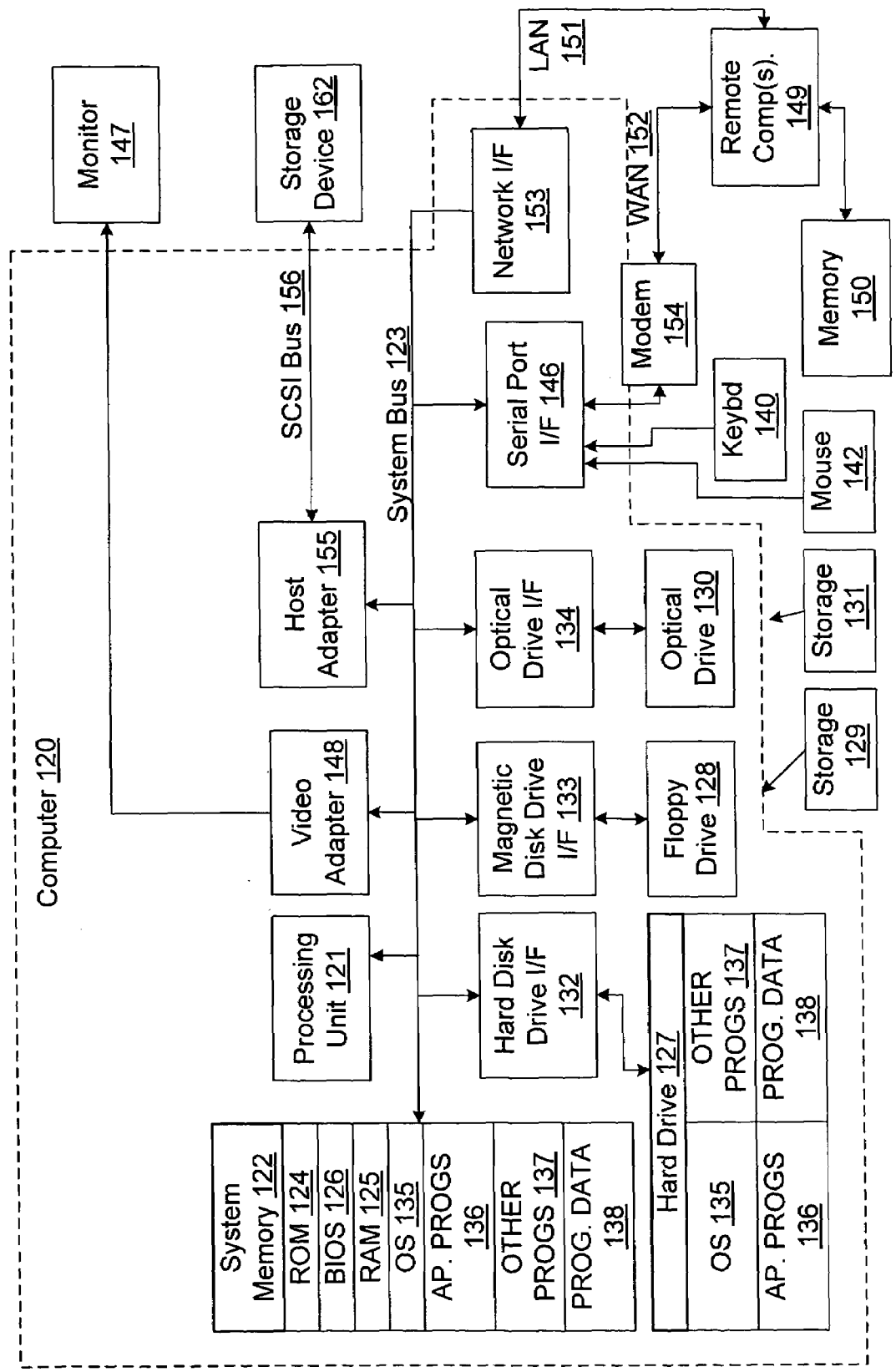
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Generic Packaging Tool and Component

Figure 2:
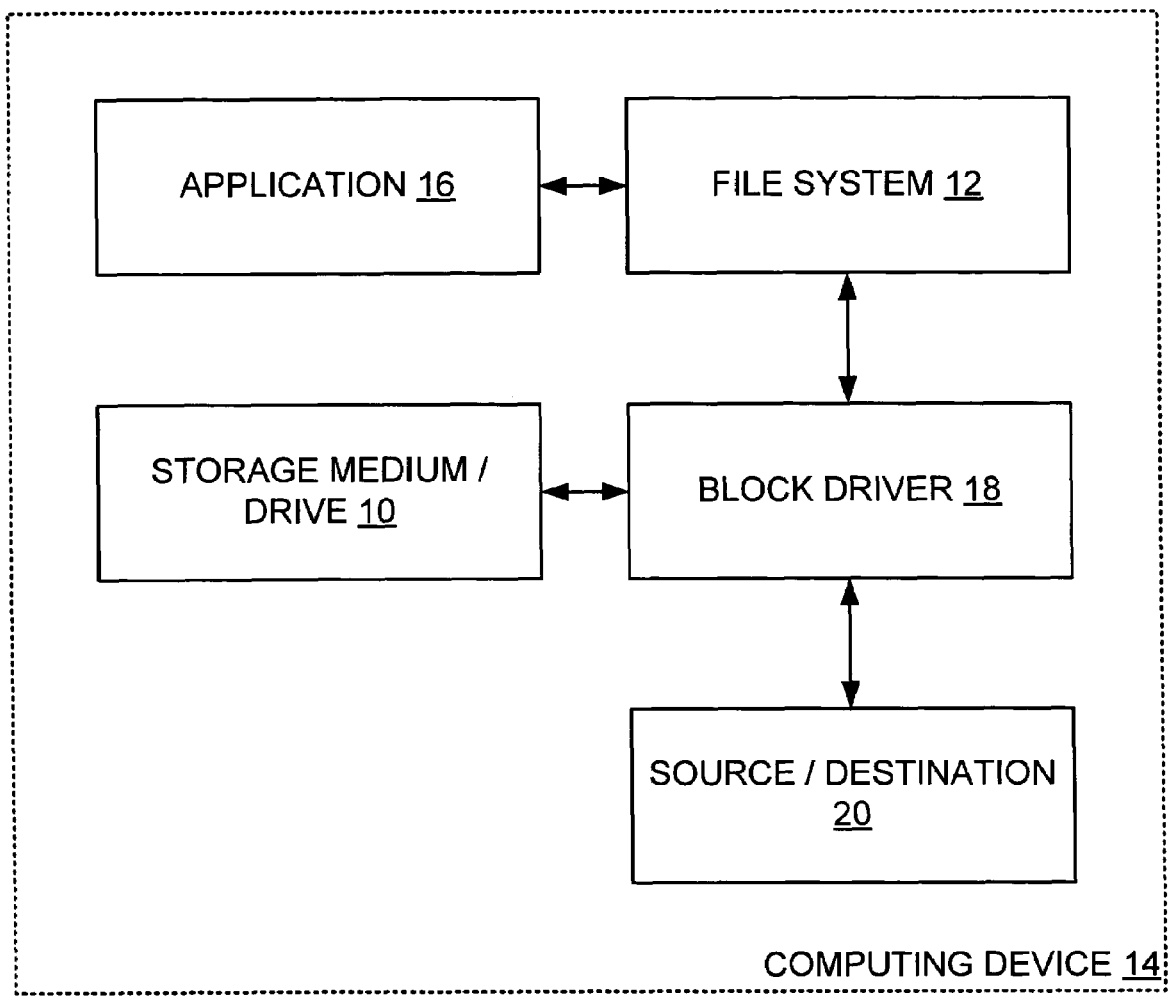
FIG. 2 is a block diagram showing an application, a file system, and a block driver of a drive associated with a computer, among other things.

In one embodiment of the present invention, and turning now to FIG. 2, data is copied from a source 20 thereof to any of one or more storage media 10 such as drives managed by a file system 12 of a computing device 14, or is copied to a destination 20 thereof from any of the one or more drives 10 managed by the file system 12 of the computing device 14, without passing through such file system 12. With the present invention, then, an application 16 effectuates a transfer of data by informing the file system 12 of the source 20 or destination 20 of the data to be transferred along with other information relating to the data as necessary, and the file system 12 compiles a list of all sectors in the drive 10 occupied by the data or to be occupied by the data. Thereafter, the file system 12 sends the compiled sector list to the block driver 18 of the drive 10, along with information about how to access the source or destination 20, and the block driver 18 then directly communicates with such source or destination 20 and obtains the data therefrom or delivers the data thereto.

Note that the computing device 14 may be any appropriate computing device 14 with a file system 12 without departing from the spirit and scope of the present invention. For example, the computing device 14 may be a personal computer or the like, a portable player, a personal data assistant, a server computer, etc. Typically, although not necessarily, the computing device 14 has an application 16 operating thereon that initiates the transfer of data.

Note, too, that the source or destination 20 of the data may be any appropriate source or destination 20 without departing from the spirit and scope of the present invention. For example, such source/destination 20 may be another drive 10, RAM, flash memory, or the like on the computing device 14, or else some storage medium 10 external to the computing device 14 but accessible by such computing device 14.

Similarly, the drive 10 associated with the computing device 14 may be any drive 10 accessible by the file system 12 of the computing device 14, including real and virtual drives, without departing from the spirit and scope of the present invention. Of course, such drive 10 requires a block driver 18 capable of directly communicating with the source/destination 20 to obtain data therefrom or deliver data thereto. For example, such drive 10 may be a hard drive or a partitioned portion of a hard drive, may be a virtual drive operating in RAM or a flash memory, may be a remote drive accessible to the file system, may be a file server, or the like. As should be appreciated, such drive 10 may be internal to or external from the computing device 14, may be local or remote, and may or may not be under the direct control of the computing device 14, among other things.

Figure 3:
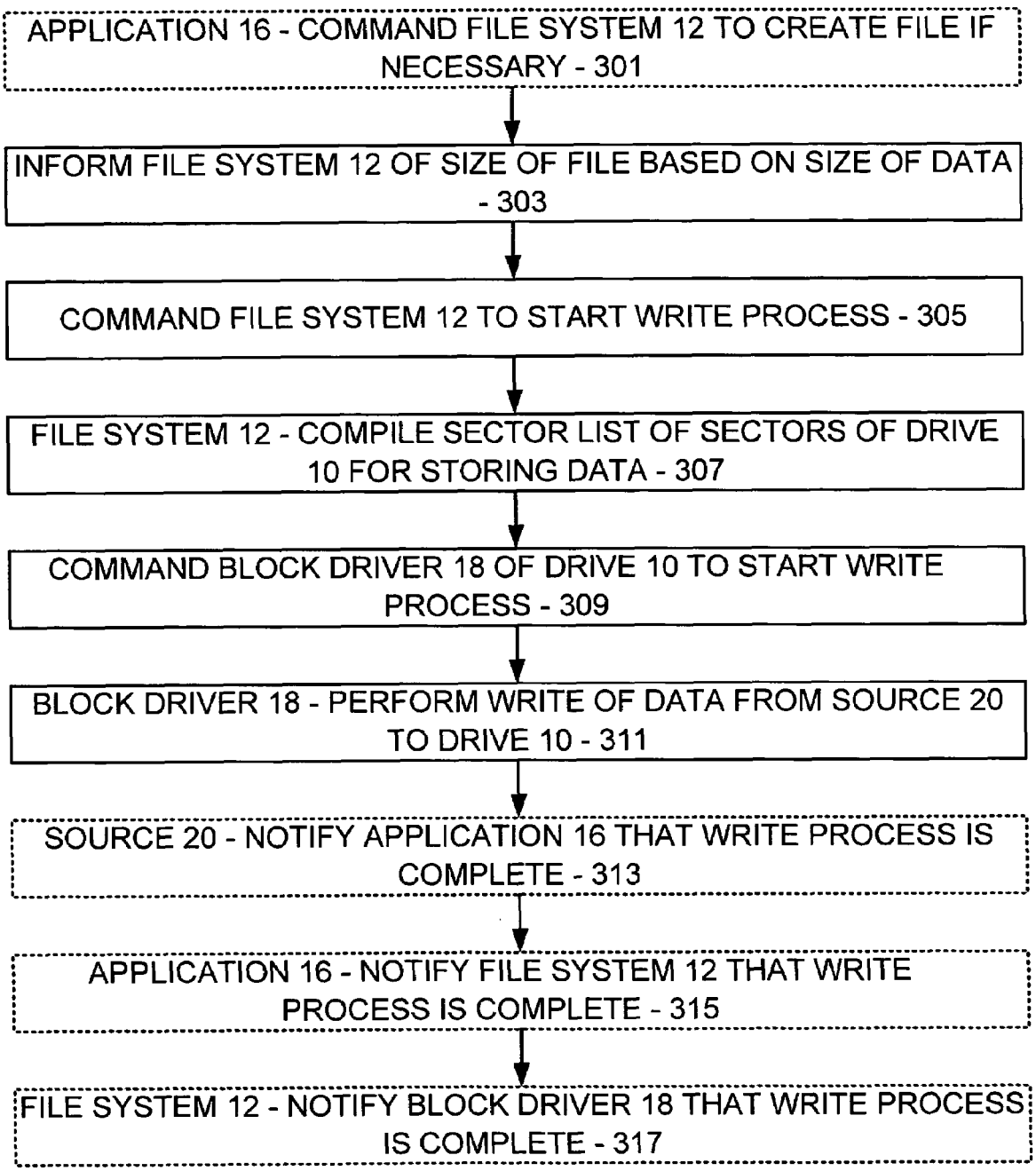
FIGS. 3 and 4 are flow diagrams showing key steps performed by the elements of FIG. 2 to write to (FIG. 3) or read from (FIG. 4) the drive in accordance with one embodiment of the present invention.

In one embodiment of the present invention, then, referring now to FIG. 3, an application 16 or the like associated with the computing device 14 wishes to write data from a source 20 to a drive 10 associated with the computing device 14 under the control of the file system 12 thereof. Presumptively, the application 16 has knowledge of the size of the data, and the data is to reside on the drive 10 as a newly created or a modified file. Accordingly, the application 16 issues a command to the file system 12 to create the file if necessary (step 301), and also informs the file system 12 of the size of the file based on the size of the data (step 303).

Although the file system 12 as employed in the present invention is not an intermediary in the transfer of the data, the file system 12 nevertheless manages the drive 10 and therefore is employed to allocate space thereon. Accordingly, in one embodiment of the present invention, the application 16 issues a command to the file system 12 to start the write process (step 305), where the start command includes an identification of the source 20 and the location of the data at such source 20. In response thereto, and based on sector information maintained by the file system 12, such file system 12 in fact allocates space for such data. In particular, the file system 12 determines available sectors for the entirety of the data based on the size thereof as was determined at step 303, and compiles a sector list including an identification of the sectors of the drive 10 that are to be used to store the entirety of the data (step 307).

Thereafter, the file system issues a command to the block driver 18 of the drive 10 to start the write process (step 309), where the start command includes the identification of the source 20 and the location of the data at such source 20 and also includes the compiled sector list. Note, though, that the file system 12 does not actually deliver any of the data to the block driver 18. Significantly, and in one embodiment of the present invention, with the sector list and the identification and location information from the file system 12, the block driver 18 performs the write of such data to the drive 10 (step 311) by as appropriate contacting the source 20 at the identification thereof and requesting and receiving therefrom the entirety of the data at the location thereof at such source 20, and forwarding such data to sectors of the drive 10 as identified within the sector list. Such writing of such data from the source 20 to the drive 10 by way of the block driver 18 may be performed in any appropriate manner without departing from the spirit and scope of the present invention. As may be appreciated, such writing of such data is known or should be apparent to the relevant public and therefore need not be set forth herein in any detail. For example, such writing may be achieved as a continuous stream of data or a series of portions of such data. In the latter case it is to be appreciated that although received in multiple portions, the data is received directly from the source 20 without first passing through the file system 12. At any rate, the block driver 18 stores the written data on the drive 10 as received directly from the source 20 without the file system 12 as an intermediary, and does so according to the sector list in a generally known manner.

At this point, the data is in fact written from the source 20 to the drive, and nothing more need necessarily be done. However, as an administrative manner, the source 20 may notify the application 16 that the write process is complete (step 313), the application 16 may likewise issue a command to the file system 12 that the write process is complete (step 315), and the file system 12 may also likewise issue a command to the block driver 18 of the drive 10 that the write process is complete (step 317). Accordingly, each of the application 16, the file system 12, and the block driver 18 can administratively close out the write process and/or otherwise perform any necessary completion functions.

Similarly to writing data, and in one embodiment of the present invention, the application 16 may wish to read data from a drive 10 of the computing device 14 under the control of the file system 12 thereof to a destination 20. Here, though, the data already exists as a file or the like on the drive 10. Accordingly, the application 16 issues a command to the file system 12 to open the file. Note, though, that here the file system 12 can itself determine the size of the file or data and therefore need not be informed of same by the application 16.

Figure 4:
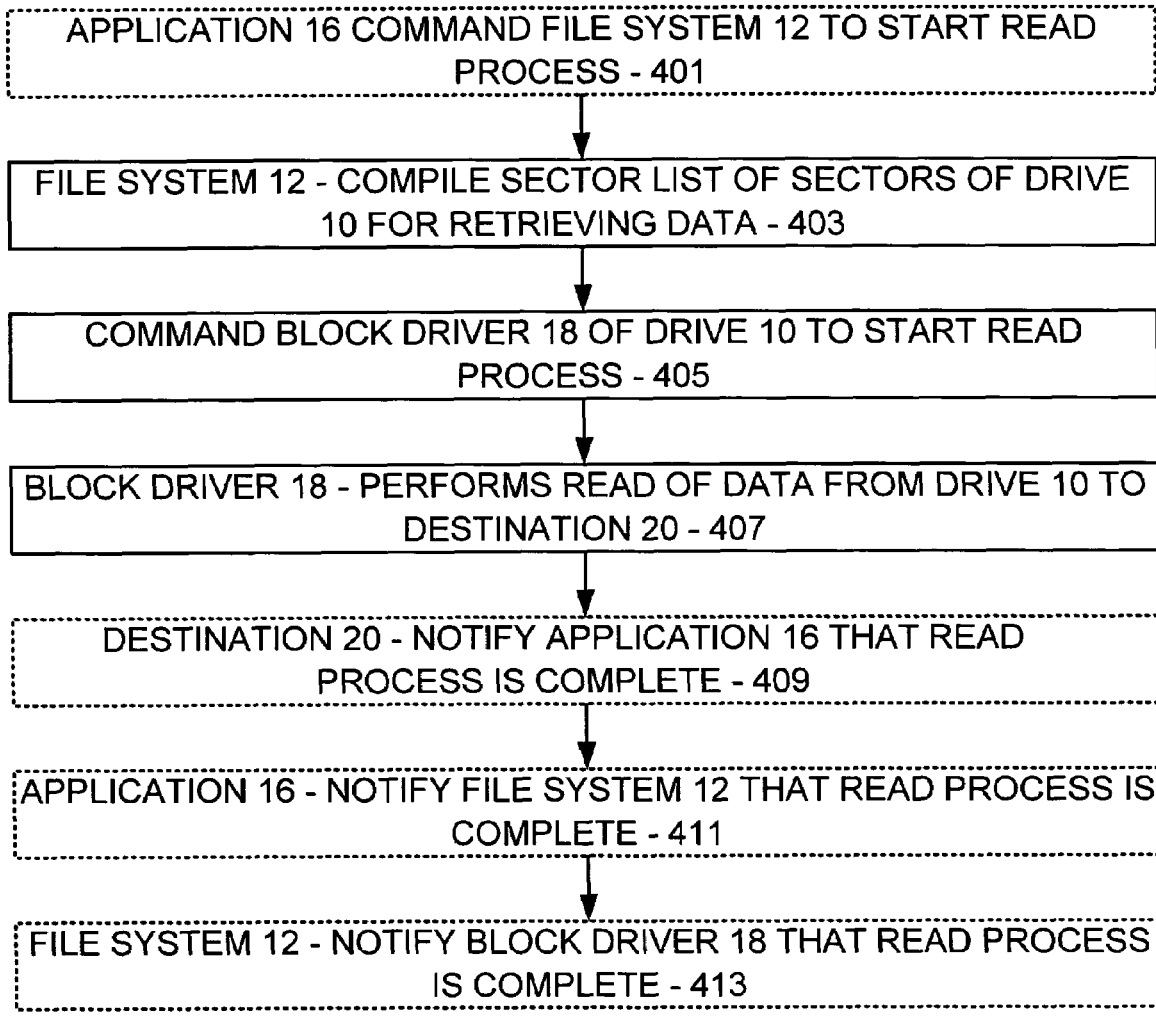

As before, although the file system 12 is not an intermediary in the transfer of the data, the file system 12 nevertheless manages the drive 10 and therefore must be employed to locate the data in the file thereon. Accordingly, and turning now to FIG. 4, the application 16 issues a command to the file system 12 to start the read process (step 401), where the start command includes an identification of the destination 20 and if necessary the location of the data at such destination 20, and based on sector information maintained thereby, the file system 12 finds the sectors on the drive with such data. In particular, the file system 12 determines the sectors for the entirety of the data as stored on the drive 10, and compiles a sector list including an identification of the sectors of the drive 10 that are to be used to retrieve the entirety of the data (step 403).

Thereafter, the file system 12 issues a command to the block driver 18 of the drive 10 to start the read process, where the start command includes the identification of the destination 20 and if necessary the location of the data at such destination 20 and also includes the sector list (step 405). Here, the start command may also include a size for the data in the event that such data ends before the end of the last sector thereof. As before, it is to be noted that the file system 12 does not actually deliver any of the data from the drive 10/block driver 18. Significantly, and in one embodiment of the present invention, with the sector list, the size, and the identification and location information from the file system, the block driver 18 performs the read by as appropriate contacting the destination 20 at the identification thereof and delivering thereto the entirety of the data at the location thereof, where such data is obtained from the sectors thereof on the drive 10 (step 407). Such reading of such data from the drive 10 by way of the block driver 18 thereof to the destination 20 may then be performed in any appropriate manner without departing from the spirit and scope of the present invention. As may be appreciated, such reading of such data is known or should be apparent to the relevant public and therefore need not be set forth herein in any detail. For example, and again, such reading may be achieved as a continuous stream of data or a series of portions of such data according to the sector list. In the latter case, and again, it is to be appreciated that although delivered in multiple portions, the data is delivered by the block driver 18 from the drive 10 directly to the destination 20 without first passing through the file system 12. At any rate, the destination 20 stores the read data as received directly from the block driver 18 without the file system 12 as an intermediary in a generally known manner.

At this point, the data is in fact read from the drive to the destination 20, and nothing more need necessarily be done. However, and again, as an administrative manner, the destination 20 may notify the application 16 that the read process is complete (step 409), the application 16 may likewise issue a command to the file system 12 that the read process is complete (step 411), and the file system 12 may also likewise issue a command to the block driver 18 of the drive 10 that the read process is complete. Accordingly, and again, each of the application 16, the file system 12, and the block driver 18 can administratively close out the read process and/or otherwise perform any necessary completion functions.

CONCLUSION

It is to be appreciated that in at least some settings, both the block driver 18 and the file system 12 are implemented in the same software module. Thus, there may or may not be an internal division between the portions of such module fulfilling the functions that are associated with such block driver 18 and file system 12. Even in such a setting, the present invention as set forth herein may still be applied inasmuch as the combined block driver 18/file system 12 still communicates directly with the source/destination 20. Thus, and again, the application 16 can step aside from data transactions, with the result being a significant efficiency during data transfers.

The present invention may be practiced with regard to any appropriate application 16, drive 10 with a block driver 18, source/destination 20, and computing device 14 with a file system 12. As should now be appreciated, with the present invention, data is delivered from a source 20 or the like directly to a drive 10 or the like associated with a computing device 14 without first passing through the file system 12 of such computing device 14. Also, data is delivered from a drive 10 or the like associated with a computing device 14 directly to a destination 20 or the like without first passing through the file system 12 of such computing device 14. Thus, the data need not first pass through the file system 12 upon being transferred. Note that use of the term 'directly' requires only bypassing the file system 12, and does not require a direct link between the source/destination 20 and the drive 10. As may be appreciated, by avoiding the file system 12, the transfer of data is performed in a less cumbersome manner with significantly increased efficiency, especially inasmuch as the application 16 and the file system 12 need only issue one start command per transfer, among other things.

Thus, administrative overhead in the file system 12 is avoided, and also repeated involvement in the data transfer by the application 16 is also avoided. Note that the technique described herein may also be useful in the case where the file system 12 and the block driver 18 are essentially one and the same, which may for example be the case in relatively simple computing devices 14. Even here there is a gain in efficiency because the application 16 does not have to read each part of the data and write same to such a combination file system 12/block driver 18.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful method that allows data to be transferred to or from a drive 10 in a more efficient and less cumbersome manner. Such data is delivered from a source 20 or the like directly to a storage medium 10 such as a hard drive or the like associated with a computing device 14 without first passing through the file system 12 of such computing device 14, or is delivered from such storage medium 10 directly to a destination 20 or the like without first passing through the file system 12 of such computing device 14. Notably, such data need not touch upon the application 16 either. It should be appreciated that changes could be made to the embodiments described above without departing from the inventive concepts thereof. In general then it should be understood that this invention is not limited to the particular embodiments disclosed, but it is intended to cover modifications within the spirit and scope of the present invention.

The invention claimed is:

1. A method for an application on a computing device to write data from a source to a storage medium associated with the computing device, the method comprising:

the application issuing an application command to a file system of the computing device, the application command including an identification of the source and a location and size of the data at the source;

the file system based on space information maintained thereby and the size of the data allocating space on the medium for the data and compiling a list including an identification of each portion of the medium that is to be used to store the data;

the file system issuing a file system command to a block driver of the medium, the file system command including the identification of the source and the location of the data at such source and also including the compiled list; and the block driver contacting the source at the identification thereof and requesting therefrom the data at the location thereof, and writing the data at the location from the source to the portions of the medium included in the compiled list, wherein the medium receives the data from the source without the data first passing through the file system, after the block driver has completed the write of all of the data from the source to the medium, the source notifying the application that the write is complete, the application notifying the file system that the write is complete, and the file system notifying the block driver that the write is complete.

2. The method of claim 1 further comprising the application issuing a command to the file system to create the file on the medium.

3. The method of claim 2 further comprising the application informing the file system of the size of the data.

4. The method of claim 1 comprising the file system determining available sectors of the medium for all of the data and compiling a sector list including an identification of each sector of the medium that is to be used to store the data.

5. A method for an application on a computing device to read data from a storage medium associated with the computing device to a destination, the method comprising:

the application issuing an application command to a file system of the computing device, the application command including an identification of the destination and a location and size of the data at the destination;

the file system based on space information maintained thereby and the size of the data locating space on the medium having the data and compiling a list including an identification of each portion of the medium that stores the data;

the file system issuing a file system command to a block driver of the medium, the file system command including the identification of the destination and the location of the data at such destination and also including the compiled list; and the block driver contacting the destination at the identification thereof and delivering thereto the data at the location thereof upon reading the data from the portions of the medium included in the compiled list, wherein the destination receives the data from the medium without the data first passing through the file system, after the block driver has completed the read of all of the data from the medium to the destination, the destination notifying the application that the read is complete, the application notifying the file system that the read is complete, and the file system notifying the block driver that the read is complete.

6. The method of claim 5 further comprising the file system informing the block driver of the size of the data to be read.

7. The method of claim 5 comprising the file system determining sectors of the medium having all of the data and compiling a sector list including an identification of each sector of the medium that is to be used to read the data.

8. A computer-readable medium having stored thereon computer-executable instructions implementing a method for an application on a computing device to write data from a source to a storage medium associated with the computing device, the method comprising:

the application issuing an application command to a file system of the computing device, the application command including an identification of the source and a location and size of the data at the source;

the file system based on space information maintained thereby and the size of the data allocating space on the medium for the data and compiling a list including an identification of each portion of the medium that is to be used to store the data;

the file system issuing a file system command to a block driver of the medium, the file system command including the identification of the source and the location of the data at such source and also including the compiled list; and the block driver contacting the source at the identification thereof and requesting therefrom the data at the location thereof, and writing the data at the location from the source to the portions of the medium included in the compiled list, wherein the medium receives the data from the source without the data first passing through the file system, after the block driver has completed the write of all of the data from the source to the medium, the source notifying the application that the write is complete, the application notifying the file system that the write is complete, and the file system notifying the block driver that the write is complete.

9. The medium of claim 8 wherein the method further comprises the application issuing a command to the file system to create the file on the medium.

10. The medium of claim 9 wherein the method further comprises the application informing the file system of the size of the data.

11. The medium of claim 8 wherein the method comprises the file system determining available sectors of the medium for all of the data and compiling a sector list including an identification of each sector of the medium that is to be used to store the data.

12. A computer-readable medium having stored thereon computer-executable instructions implementing a method for an application on a computing device to read data from a storage medium associated with the computing device to a destination, the method comprising:

the application issuing an application command to a file system of the computing device, the application command including an identification of the destination and a location and size of the data at the destination;

the file system based on space information maintained thereby and the size of the data locating space on the medium having the data and compiling a list including an identification of each portion of the medium that stores the data;

the file system issuing a file system command to a block driver of the medium, the file system command including the identification of the destination and the location of the data at such destination and also including the compiled list; and the block driver contacting the destination at the identification thereof and delivering thereto the data at the location thereof upon reading the data from the portions of the medium included in the compiled list, wherein the destination receives the data from the medium without the data first passing through the file system, after the block driver has completed the read of all of the data from the medium to the destination, the destination notifying the application that the read is complete, the application notifying the file system that the read is complete, and the file system notifying the block driver that the read is complete.

13. The medium of claim 12 wherein the method further comprises the file system informing the block driver of the size of the data to be read.

14. The medium of claim 12 wherein the method comprises the file system determining sectors of the medium having all of the data and compiling a sector list including an identification of each sector of the medium that is to be used to read the data.

* * * * *